(12) United States Patent (10) Patent No.: US 9,104,971 B1
Chamness et al. (45) Date of Patent: Aug. 11, 2015

(54) AUTOMATED END-TO-END SALES PROCESS OF STORAGE APPLIANCES OF STORAGE SYSTEMS USING PREDICTIVE MODELING

(75) Inventors: Mark Chamness, Menlo Park, CA (US); David Singer, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 301 days.

(21) Appl. No.: 13/538,993

(22) Filed: Jun. 29, 2012

(51) Int. Cl.
*G06F 9/44* (2006.01)
*G06N 5/04* (2006.01)
*G06N 7/00* (2006.01)

(52) U.S. Cl.
CPC .............. *G06N 5/048* (2013.01); *G06N 7/005* (2013.01)

(58) Field of Classification Search
CPC ....... G06N 99/005; G06N 7/005; G06N 7/04; G06N 7/02; G06N 7/06; G06N 5/048; G06N 5/04; G06F 12/00; G06F 9/44
USPC ............. 706/52; 709/224; 705/348; 711/112, 711/117, 154, 162
See application file for complete search history.

(56) References Cited

U.S. PATENT DOCUMENTS

| | | | | |
|---|---|---|---|---|
| 8,688,927 | B1 * | 4/2014 | Chamness | 711/154 |
| 2007/0033368 | A1 * | 2/2007 | Taguchi et al. | 711/170 |
| 2008/0281564 | A1 * | 11/2008 | Suzuki et al. | 703/2 |
| 2010/0114793 | A1 * | 5/2010 | Eder | 705/348 |
| 2011/0197027 | A1 * | 8/2011 | Balasubramanian et al. | 711/117 |
| 2011/0252134 | A1 * | 10/2011 | Villeneuve et al. | 709/224 |
| 2011/0270795 | A1 * | 11/2011 | Smith et al. | 706/52 |
| 2012/0042122 | A1 * | 2/2012 | Beniyama et al. | 711/112 |
| 2012/0137100 | A9 * | 5/2012 | Kavuri | 711/170 |
| 2013/0166486 | A1 * | 6/2013 | Kim | 706/46 |

OTHER PUBLICATIONS

Richards K. et al., "Customer relationship management: Finding value drivers", Industrial Marketing Management, 37, 2008, pp. 120-130.*
Chamness, Mark, "Capacity Forecasting in a Backup Storage Environment," USENIX LISA '11: 25th Large Installation System Administration Conference, Dec. 4-9, 2011, Boston, MA, 9 pages.

* cited by examiner

*Primary Examiner* — Jeffrey A Gaffin
*Assistant Examiner* — Dave Misir
(74) *Attorney, Agent, or Firm* — Van Pelt, Yi & James LLP

(57) ABSTRACT

Techniques for generating end-to-end sales leads based on storage capacity forecast using predictive modeling are described herein. According to one embodiment, diagnostic data is received from a data collector that periodically collects the diagnostic data from a storage system having one or more storage units to store data objects. A capacity forecaster coupled to the data collector forecasts a full capacity date using predictive modeling based on the diagnostic data, where the full capacity date estimates a date in which the one or more storage units reach a full storage capacity. A context generator coupled to the capacity forecaster generates a context having information identifying the one or more storage units of the storage system and an operator operating the storage system, wherein the context is used to communicate with the operator for acquiring an additional storage unit to increase storage capacity prior to the full capacity date.

18 Claims, 7 Drawing Sheets

FIG. 4

| LEAD DETAIL | EDIT | CONVERT | CLONE | SHARING | FIND DUPLICATES | UPDATE FROM JIGSAW |

LEAD INFORMATION

| LEAD STATUS | DISQUALIFIED | | |
|---|---|---|---|
| LEAD STATUS INFO | DQ - NOT INTERESTED 404 | PHONE | (888) 123-4567 |
| LEAD OWNER | ☒ STEPHANIE SMITH [CHANGE] | PHONE EXTENSION | |
| NAME | DD_CAPACITY_ALERTS_Q212-ABC INDUSTRIES | E-MAIL | |
| | | WEBSITE | HTTP://WWW.ABC-INDUSTRIES.COM |
| COMPANY | ABC INDUSTRIES | MAIN PHONE | |
| TITLE | | MOBILE | |
| DEPARTMENT | | FAX | |
| INDUSTRY | | DO NOT CALL | |
| DIVISION | | SUB REGION | COM CENTRAL - MIDWEST |
| ADDRESS | 123 N. MAIN ST CHICAGO, IL USA (US) | LEAD REGION | BRS COMM CENTRAL DIVISION |
| ANNUAL REVENUE | | LEAD THEATER | AMER |
| NO. OF EMPLOYEES | | PROACTIVE CONTACT ID | |
| PROSPECT RATING | | LIST SOURCE | |
| MOST RECENT CAMPAIGN | DATA DOMAIN CAPACITY | LEAD SOURCE | ASUP-DD-CAPACITY-ALERT |
| EMC LAST CAMPAIGN | | LEAD OWNER NAME | STEPHANIE SMITH 402 |
| ASSESSMENT REQUEST | | LEAD GROUP | DATA DOMAIN LEAD |
| CONTACT REQUEST | | DELL_NEW_LEADS | |
| ASSESSMENT REQUEST CAMPAIGN | | ALERT AREA MANAGER | |
| GMDB ACTIVITY ID | | ALERT NOTES | CAPACITY ALERT: A/N 1230309040, HOSTNAME:DD01.ABC.COM. CURRENT CAPACITY: 91%, REACHING 100% CAPACITY ON: 05/22/2012 (SEE LINK TO SYSTEM CHARTS BELOW) 403 HTTP://TABLEAU.DATADOMAIN.COM/VIEWS/ASUPASSETCA... |
| GMDB CUSTOMER ID | | SYSTEMURL | |
| | | CONTACT NOTES | |
| DAYS OPEN GROUP | 00-05 DAYS | SYSTEMID | 1230309040 |
| GMDB CONTACT ID | | INSIDE ACCOUNT MANAGER | |
| EIMS STATUS | | | |

401 brackets the upper portion of the LEAD INFORMATION section.

| Count | Lead Status | | | | | | | | |
|---|---|---|---|---|---|---|---|---|---|
| Lead Theater | Open | Working | Disqualified | Converted-Meeting Set / Opp Created | Converted-Completed / Disqualified | Converted-Disqualified / Previously sold | Converted-Tech Refresh Opp in Progress | Converted-Field Engaged | Converted-No Refresh Opp | Grand Total |
| EMEA | 146 | 18 | 38 | 19 | 0 | 0 | 0 | 0 | 0 | 221 |
| APJ | 98 | 0 | 7 | 3 | 0 | 0 | 0 | 0 | 0 | 108 |
| AMER | 491 | 109 | 153 | 40 | 1 | 1 | 4 | 1 | 1 | 801 |
| Grand Total | 735 | 127 | 198 | 62 | 1 | 1 | 4 | 1 | 1 | 1130 |

FIG. 5

AUTOMATED END-TO-END SALES PROCESS OF STORAGE APPLIANCES OF STORAGE SYSTEMS USING PREDICTIVE MODELING

RELATED APPLICATIONS

This application is related to co-pending U.S. patent application Ser. No. 13/334,479, entitled "Capacity Forecasting for Backup Storage," filed Dec. 22, 2011, which is incorporated by reference herein in its entirety.

FIELD OF THE INVENTION

Embodiments of the present invention relate generally to data storage systems. More particularly, embodiments of the invention relate to automated sales processes based on storage capacity predictive modeling.

BACKGROUND

Data storage utilization is continually increasing, causing the proliferation of storage systems in data centers. Monitoring and managing these systems require increasing amounts of human resources. Information technology (IT) organizations often operate reactively, taking action only when systems reach capacity, at which point performance degradation or failure has already occurred. Predictive modeling has been applied to many fields, such as forecasting traffic jams, anticipating electrical power consumption, etc. Predictive modeling has also been utilized in forecasting storage capacity of a data storage system and generating alert notifications before the storage system reaches full capacity. However, such storage capacity forecasting data has not been fully utilized to provide sales opportunities to a storage provider that provides the storage systems.

BRIEF DESCRIPTION OF THE DRAWINGS

Embodiments of the invention are illustrated by way of example and not limitation in the figures of the accompanying drawings in which like references indicate similar elements.

FIG. 4 is a screenshot illustrating a graphical user interface (GUI) for generating and maintaining sales lead information based on forecast full capacity date according to one embodiment of the invention.

FIG. 5 is a block diagram illustrating lead status of sales leads according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for generating end-to-end sales leads based on storage capacity forecast using predictive modeling are described herein. According to some embodiments, a predictive model is created and utilized to predict the date of full capacity for a storage system, where the full capacity date is an estimated date that storage units of the storage system potentially reach their full capacity. The full capacity date may be forecast based on diagnostic data periodically collected from the storage system. Based on the full capacity date, a context, also referred to as a sales lead is generated. The sales lead includes information identifying at least a type or types (e.g., model numbers) of storage units of the storage system, the estimated date of full capacity, the contact information of a client such as an owner or operator of the storage system, as well as the interactive history with the client. The sales lead may be utilized by sales personnel of a storage provider that provides the storage system to contact and to present the case to the client that the client may need additional storage prior to the storage capacity runs out. Furthermore, a mechanism is also provided to allow a user to evaluate follow-up processes of the sales lead. The evaluation may serve as a feedback to further adjust the predictive modeling for subsequent storage capacity forecast and/or to further fine tune subsequent sales lead generation.

Figure 1:
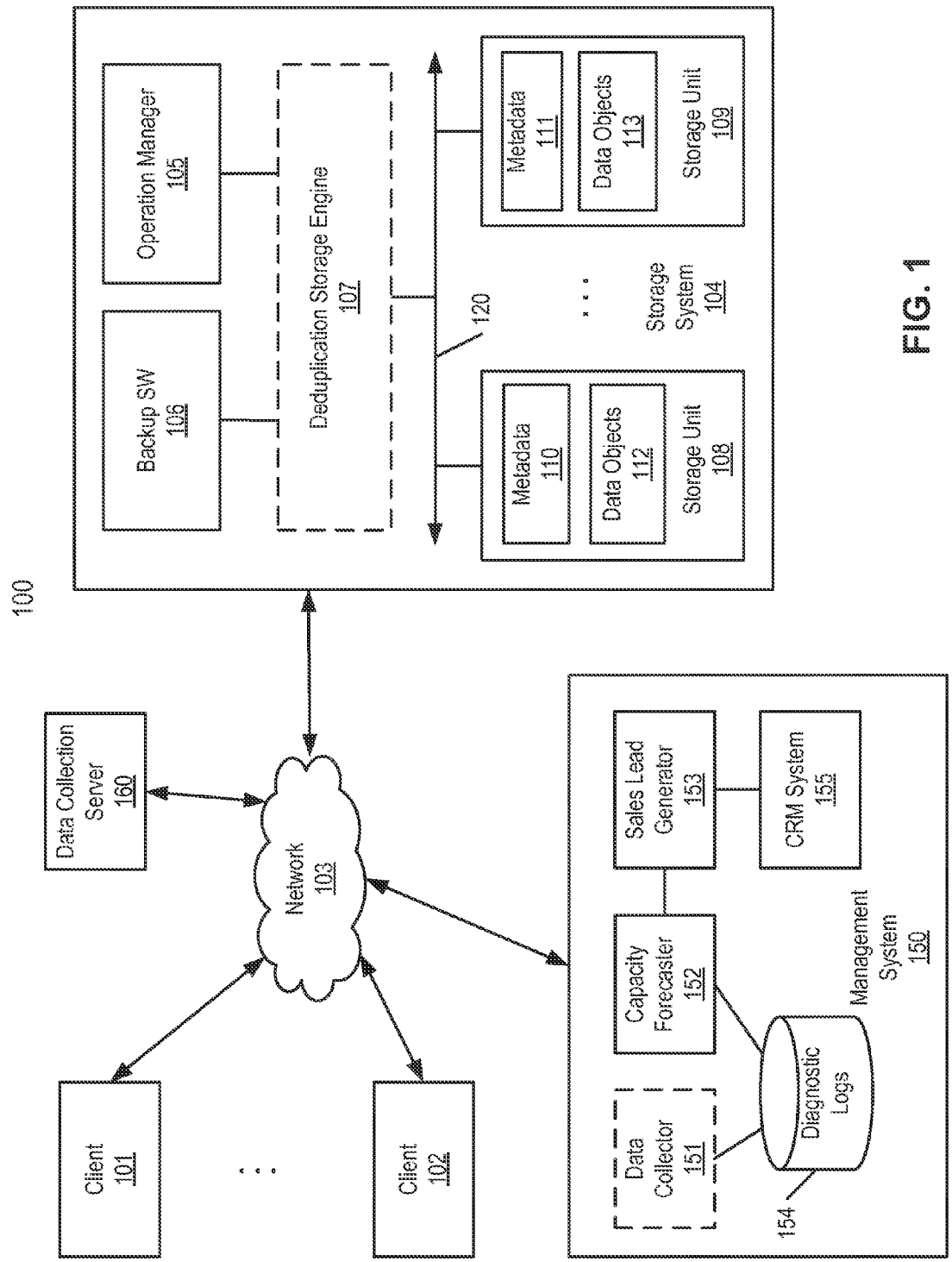
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup engine or software 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, optional deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, storage system 104 further includes an operation manager 105 to manage and monitor operations performed by storage system 104, including periodically collecting and transmitting operating diagnostic data to a remote device such as management system 150 over network 103. In this example as shown in FIG. 1, storage system 104 may be located at a client site and utilized by a client such as an enterprise or corporation, where the storage system 104 may be provided by a storage provider or vendor such as EMC Corporation. In one embodiment, operation manager 105 periodically collects operating statistics concerning operations of storage units 108-109 and transmits diagnostic data representing at least some of the operating statistics to management system 150, where management system 150 is associated with a storage provider or vendor that provides storage system 104 to a client. For example, management system 150 may be operated or owned by the storage provider or alternatively, it may be operated by a third-party vendor on behalf of the storage provider. In one embodiment, the diagnostic data may include total storage capacity of a storage system and total storage space used by the storage system at the time the diagnostic data is captured.

According to one embodiment, management system 150 includes a data collector 151, capacity forecaster 152, and sales context generator 153. Data collector 151 is employed to communicate with operation manager 105 of storage system 104 to collect diagnostic data concerning operating statuses of storage units 108-109, as well as storage system 104 in general. Note that although one storage system is shown, data collector 151 may communicate with multiple operation managers of multiple storage systems to collect diagnostic data concerning the respective storage systems, which may be located at the same or different geographical locations (e.g., same or different client sites). For example, management system 150 may be a centralized management server or cluster of servers for single or multiple clients or customers.

The collected diagnostic data is stored in a storage device as part of diagnostic logs 154. In one embodiment, diagnostic data 154 includes information describing the amount of data that can be stored in a storage system and the amount of data that is currently stored in the storage system. In one embodiment, capacity forecaster 152 is to perform an analysis on the diagnostic data 154 to forecast a full capacity date approximately representing the date when storage units of a storage system, such as storage units 108-109 of storage system 104 reach their respective full capacity. According to one embodiment, capacity forecaster 152 performs an analysis on a set of diagnostic data selected from the collected diagnostic data from diagnostic logs 154 using a predictive modeling method. One of the most common methods employed in predictive modeling is linear regression. Note that data collector 151 is optional here, as diagnostic data 154 can be collected by a third party entity, such as another server 160, and transmitted to management server 150 for processing. Server 150 and/or server 160 may represent a cloud server or a cluster of cloud servers.

Automatically predicting future capacities is accomplished by performing one or more linear regressions on historical diagnostic data to determine the current usage behavior, and extrapolating the current behavior to the point in the future when system capacity is exhausted. An assumption is made that system usage is piecewise linear, e.g., for a given usage pattern, capacity changes linearly with time; periodically the usage pattern shifts, altering the slope of the linear capacity growth. The system for capacity forecasting determines the slope of the current usage pattern. Linear regressions are calculated on historical data sets of system capacity, gradually increasing the size of the data sets by adding points backwards in time from the present. While the data set is small enough to include only the current usage pattern, it will register a high R squared (e.g., goodness of fit, the coefficient of determination or $R^2$, etc.), indicating the usage pattern is roughly linear within that time interval, with R squared increasing as the data set grows longer. Once the data set includes a previous usage pattern, R squared decreases, indicating the nonlinearity. The most accurate prediction for the current usage pattern is the linear regression that produces the peak value of R squared. The slope of this linear regression indicates the slope of the current usage pattern and therefore the rate of data growth, which can be extrapolated to determine when full capacity will be reached, assuming the current behavior pattern does not change. Further detailed information concerning capacity forecasting using predictive modeling can be found in the above incorporated-by-reference co-pending application, as well as in the article entitled "Capacity Forecasting in a Backup Storage Environment," published at the $25^{th}$ Large Installation System Administration Conference, Boston, Mass., Dec. 8, 2011, which is incorporated by referenced herein in its entirety.

In some embodiments, the capacity forecasting is used to estimate the size required for new hardware. For example, after reaching full capacity next month, the quantity of capacity needed to accommodate the data storage needs for the next 12 months is based on the current growth rate. According to one embodiment, sales context generator 153 is to generate a sales context (e.g., sales lead) based on the forecast full capacity date and customer information provided from a customer relationship management (CRM) system 155. An example of the sales context is shown in FIG. 4 according to one embodiment. The sales context is then stored in a processing queue to allow a sales personnel to contact the customer in an attempt to convince the customer to acquire additional storage capacity prior to the forecast full capacity date. In addition, according to one embodiment, an evaluation is performed on the sales lead to determine the result of the sales lead such as a follow-up action taken by sales personnel. The evaluation may be used to generate and/or improve the efficacy of subsequent sales leads.

CRM is a widely implemented model for managing a company's interactions with customers, clients, and sales prospects. It involves using technology to organize, automate, and synchronize business processes, principally sales activities, but also those for marketing, customer service, and technical support. The overall goals are to find, attract, and win new clients; nurture and retain those the company already has; entice former clients back into the fold; and reduce the costs of marketing and client service. CRM describes a company-wide business strategy including customer interface departments as well as other departments. Measuring and valuing customer relationships is critical to implementing this strategy. CRM system 155 may be third-party CRM software such as those provided by Salesforce.com.

According to one embodiment, the capacity forecasting may also be utilized to provide an alert or warning notification to allow a user or an administrator to perform certain preemptive actions prior to reaching the full storage capacity. Examples of the preemptive actions may include decreasing the amount of data stored (e.g., deleting data, changing data retention policy, and/or removing older data), expanding capacity for the existing storage system (e.g., adding an additional storage shelf), and/or replacing the existing storage system with a new and larger system, etc.

Figure 2:
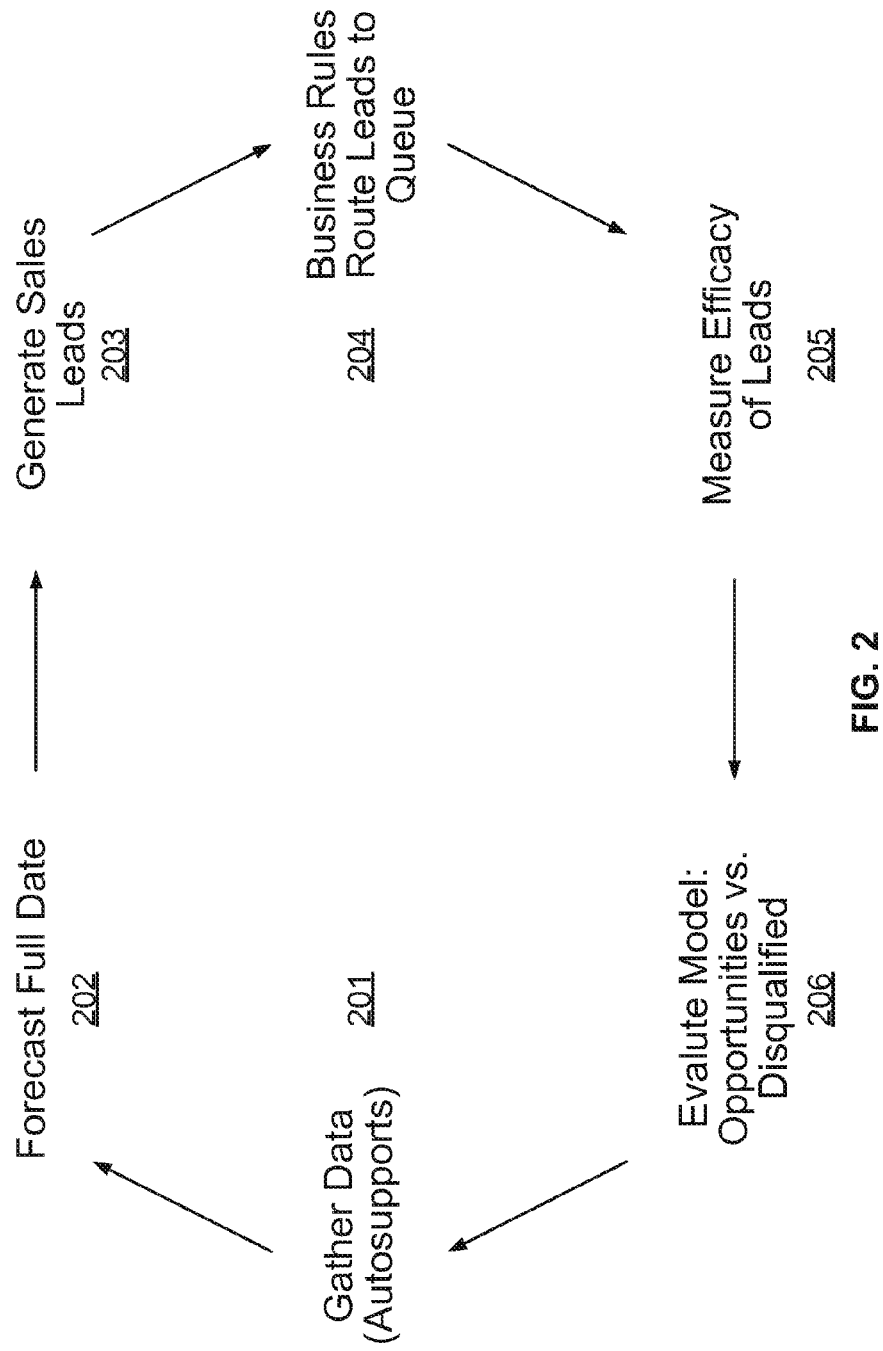
FIG. 2 is a flow diagram illustrating a processing flow of generating sales leads based on capacity forecast using predictive modeling according to one embodiment of the invention.

FIG. 2 is a flow diagram illustrating a processing flow of generating sales leads based on capacity forecast using predictive modeling according to one embodiment of the invention. Referring to FIG. 2, processing flow 200 includes various phases forming a feedback loop, including data gathering phase 201, capacity forecasting phase 202, sales lead generation phase, routing phase 204, efficacy of sales leads measuring phase 205, and predictive model evaluation phase 206. In one embodiment, during data gathering phase 201, diagnostic data is periodically collected from a storage system, including the total storage capacity of the storage system and the current usage of the storage capacity. Based on the collected diagnostic data, at phase 202, a predictive modeling method is utilized to forecast a full capacity date. During phase 203, a sales lead is generated based on the forecast full capacity date. During phase 204, the sales lead is routed to an appropriate sales person based on a set of business rules, which may be configured as part of a CRM system. Thereafter, the efficacy of the sales lead is measured during phase 205 in order to quantify the efficient use of human resources. For example, if 10% of the sales leads generated during phase 203 are converted to sales opportunities and the remainder 90% are disqualified, then the efficacy of model may be considered poor because 90% of the sales team's time is wasted on leads that do not result in sales to customers. At phase 206, the predictive model is evaluated in terms of opportunities created based on the sales lead. Such evaluations may be utilized to adjust subsequent sales lead generations and predictive modeling. For example, machine learning algorithms such as K-means clustering or principal component analysis can help determine the specific variables and their relationships that cause disqualification of sales leads. Once the underlying causes are determined, they may be employed to improve the lead generation engine, forming a continuous feedback sales process. In the above example, an improvement from a 10% to 20% opportunity conversion rate would double the efficiency of the sales organization.

Figure 3A:
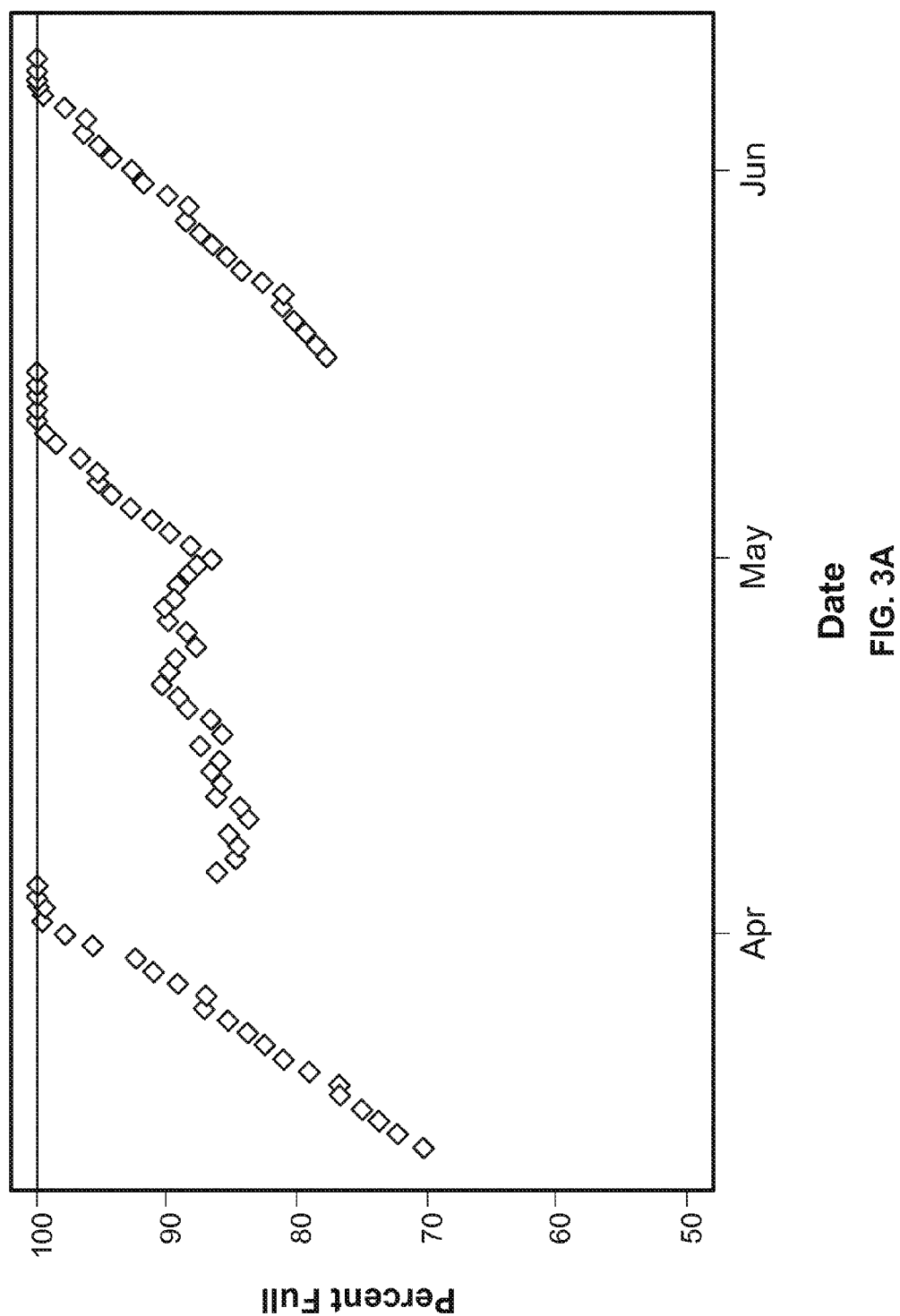
FIG. 3A is a chart illustrating diagnostic data of a particular storage system.

FIG. 3A is a chart illustrating diagnostic data of a particular storage system. Referring to FIG. 3A, the storage capacity reaches its full capacity at different points in time. Once the storage system reaches full capacity, either some data must be removed or additional storage space added. However, a storage system reaching its storage capacity may disrupt the operations of the storage system. When a storage system reaches its full storage capacity, no more data can be stored until additional storage space is acquired or reclaimed by removing other data, which may take a relatively long period of time. As shown in FIG. 3A, it is difficult to predict ahead of time when the full storage capacity will be reached.

Figure 3B:
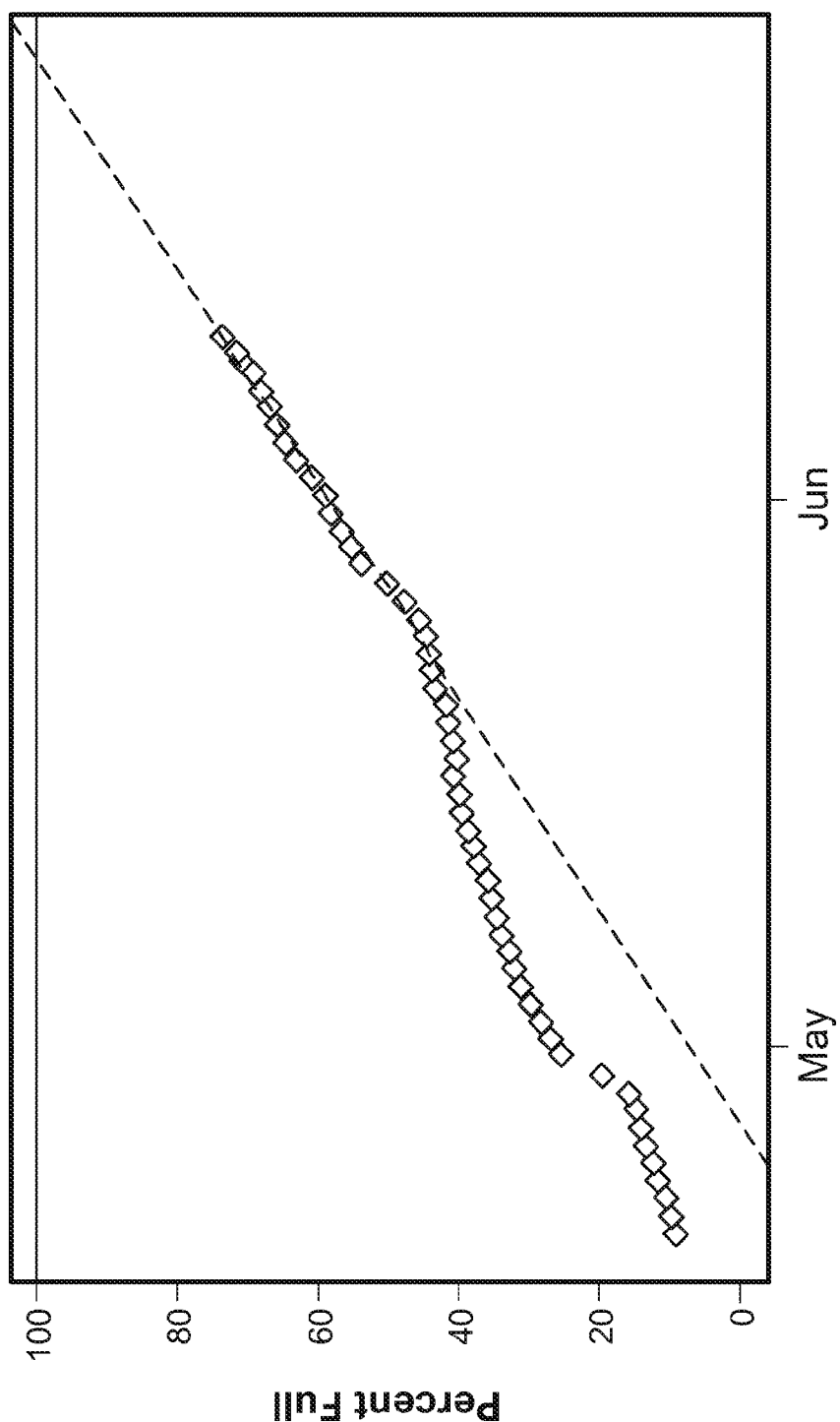
FIG. 3B is a chart illustrating storage capacity forecasting on a particular storage system using a predictive modeling method according to one embodiment of the invention.

FIG. 3B is a chart illustrating storage capacity forecasting on a particular storage system using a predictive modeling method according to one embodiment of the invention. Referring to FIG. 3B, a linear regression is performed on the collected diagnostic data such as those as shown in FIG. 3A, using a predictive modeling method as described above. As a result, a linear slope (e.g., dash line) is determined representing the capacity usage trend in the near future. Based on the graph as shown in FIG. 3B, the full capacity date can be approximately determined.

According to one embodiment, based on the estimated full capacity date, a sales context or sales lead is generated. FIG. 4 is a screenshot illustrating a graphical user interface (GUI) for generating and maintaining sales lead information based on forecast full capacity date according to one embodiment of the invention. Referring to FIG. 4, the GUI may be generated as part of CRM software to incorporate the forecast capacity and the customer relationship information. In this example, the sales lead includes customer contact information 401, including its address, phone number, and the associated Web site to allow a sales person 402 to contact the customer and to present the customer a case (e.g., graphs as shown in FIGS. 3A and 3B) to acquire additional storage capacity prior to the forecast full capacity date as indicated in field 403.

The sales context as shown in FIG. 4 may be maintained by the CRM software throughout the process. In this example, it is assumed that the sales context has been routed to the sales person specified in field 402 and the sales person has contacted the customer in an attempt to sell more storage appliances. The result of sales pitches can be stored in field 404. In this example, the status is disqualified because the customer was not interested. The results of the sales leads can be subsequently evaluated. FIG. 5 is a block diagram illustrating lead status of sales leads according to one embodiment. From the lead status as shown in FIG. 5, one can perform an analysis to fine tune subsequent predictive modeling and sales lead generation. This table shows the total number of sales leads created as well as the number that have been processed via conversations with customers. Out of 1130 sales leads created, 735 have not been processed ("Open") and 127 are currently being processed ("Working"). Of the remainder that have been processed, 62 of 268 (23%) were converted to sales opportunities. By separating the data by geography ("Lead Theater"), it allows comparison of both the rate of processing the leads as well as the efficacy of lead conversion for each geographic region.

As described above, predictive modeling can increases sales efficiency. This process requires fewer sales engineers to manage accounts—a real benefit measurable in headcount and salaries. Predictive modeling can provide a clearer view of the sales opportunities horizon. Sales should occur earlier, yielding greater time value to revenues. Predictive lead generation can help avert a competitive bidding situation. The automatically generated list of opportunities can be ordered by customer importance, opportunity size, and time relevance. By targeting leads that are running out of storage within a limited window of time, a barrier to entry is created, giving a storage provider first mover advantage. An advantage of the predictive modeling is that it easily translates across products and business units. Furthermore, the existing model is only one of many analytical models that can be developed and applied to increase revenue generation.

Figure 6:
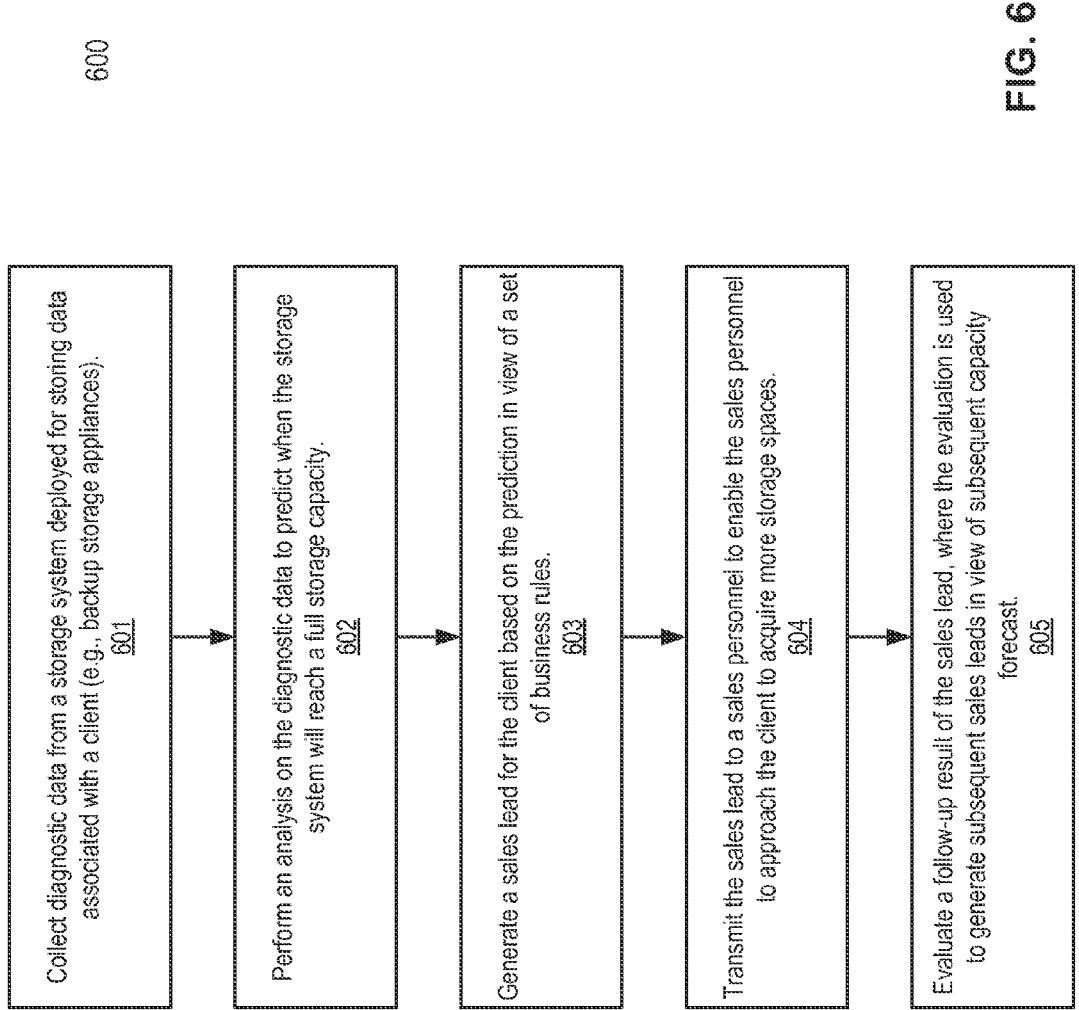
FIG. 6 is a flow diagram illustrating a method for performing an end-to-end sales process according to one embodiment of the invention.

FIG. 6 is a flow diagram illustrating a method for performing an end-to-end sales process according to one embodiment of the invention. Method 600 may be performed by processing logic that may include software, hardware, or a combination thereof. For example, method 600 may be performed by management system 150 of FIG. 1. Referring to FIG. 6, at block 601, diagnostic data is collected from a storage system deployed for storing data associated with a client (e.g., backup storage appliances). At block 602, an analysis is performed on the diagnostic data to predict when the storage system will approximately reach its full storage capacity. At block 603, a sales lead is generated for the client based on the capacity prediction in view of a set of business rules. At block 604, the sales lead is transmitted to sales personnel to enable the sales personnel to contact the client to acquire additional storage capacity prior to the forecast full capacity date. Subsequently at block 605, a follow-up result of the sales lead is evaluated, where the evaluation is used to fine tune the subsequent sales leads in view of the subsequent capacity forecast.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving diagnostic data periodically collected by a data collector from a storage system having one or more storage units to store data objects;
   forecasting, by a capacity forecaster, a full capacity date using predictive modeling based on the diagnostic data, the full capacity date estimating a date on which the one or more storage units are predicted to reach a full storage capacity;
   generating, by a context generator, a context having information identifying a type of the one or more storage units of the storage system and an operator operating the storage system, wherein the context is used to communicate with the operator for acquiring an additional storage unit to increase storage capacity prior to the full capacity date;
   identifying a user that is associated with the operator of the storage system based on a set of one or more rules;
   transmitting the context to the identified user to enable the user to contact the operator of the storage system to acquire more storage capacity prior to the forecast full capacity date, wherein the context is transmitted to the identified user at a predetermined time before the forecasted full capacity date;
   evaluating the results of one or more contexts including at least a result associated with the generated context;
   updating the context generator and the capacity forecaster based at least in part on the evaluation; and
   using the updated context generator to generate a subsequent context based at least in part on a subsequent full capacity date, wherein the using of the updated context generator to generate a subsequent context includes updating the predetermined time before the forecasted full capacity date using predictive modeling.

2. The method of claim 1, wherein the identified user has a prior relationship with the operator of the storage system.

3. The method of claim 1, wherein the identified user is located within a same geographic region as the operator of the storage system.

4. The method of claim 1, wherein the subsequent context includes information indicating whether the operator has acquired more storage capacity based on the communications between the user and the operator produced by a previous context.

5. The method of claim 1, wherein forecasting a full capacity date using predictive modeling comprising performing a linear regression on the diagnostic data to predict the full capacity date.

6. The method of claim 5, wherein the diagnostic data includes a total storage capacity and a current capacity usage of the one or more storage units of the storage system at specified points in time.

7. The method of claim 1, wherein the one or more contexts relate to a sales lead, and the evaluating of the results of the one or more contexts includes determining a lead conversion rate.

8. The method of claim 1, wherein the one or more storage units includes a plurality of storage units, and two or more of the plurality of storage units use different compression methods.

9. The method of claim 1, wherein the context generator is included in a Customer Relationship Management (CRM) system and the capacity forecaster is configured to interface with the CRM system such that the capacity forecaster communicates information relating to the full capacity date to the CRM system and receives information relating to the evaluation from the CRM system.

10. A non-transitory computer-readable medium having computer instructions stored therein, which when executed by a processor, cause the processor to perform a method, the method comprising:
    receiving diagnostic data periodically collected by a data collector from a storage system having one or more storage units to store data objects;
    forecasting, by a capacity forecaster, a full capacity date using predictive modeling based on the diagnostic data, the full capacity date estimating a date on which the one or more storage units are predicted to reach a full storage capacity;
    generating, by a context generator, a context having information identifying a type of the one or more storage units of the storage system and an operator operating the storage system, wherein the context is used to communicate with the operator for acquiring an additional storage unit to increase storage capacity prior to the full capacity date;
    identifying a user that is associated with the operator of the storage system based on a set of one or more rules;
    transmitting the context to the identified user to enable the user to contact the operator of the storage system to acquire more storage capacity prior to the forecast full capacity date, wherein the context is transmitted to the identified user at a predetermined time before the forecasted full capacity date;
    evaluating the results of one or more contexts including at least a result associated with the generated context;
    updating the context generator and the capacity forecaster based at least in part on the evaluation; and
    using the updated context generator to generate a subsequent context based at least in part on a subsequent full capacity date, wherein the of using the updated context generator to generate a subsequent context includes updating the predetermined time before the forecasted full capacity date using predictive modeling.

11. The non-transitory computer-readable medium of claim 10, wherein the identified user has a prior relationship with the operator of the storage system.

12. The non-transitory computer-readable medium of claim 10, wherein the identified user is located within a same geographic region as the operator of the storage system.

13. The non-transitory computer-readable medium of claim 10, wherein the subsequent context includes information indicating whether the operator has acquired more storage capacity based on the communications between the user and the operator produced by a previous context.

14. The non-transitory computer-readable medium of claim 10, wherein forecasting a full capacity date using predictive modeling comprising performing a linear regression on the diagnostic data to predict the full capacity date.

15. The non-transitory computer-readable medium of claim 14, wherein the diagnostic data includes a total storage capacity and a current capacity usage of the one or more storage units of the storage system at specified points in time.

16. A data processing system, comprising:
   a receiver to receive diagnostic data periodically collected by a data collector from a storage system having one or more storage units to store data objects;
   a capacity forecaster coupled to the receiver to forecast a full capacity date using predictive modeling based on the diagnostic data, the full capacity date estimating a date on which the one or more storage units are predicted to reach a full storage capacity;
   a context generator coupled to the capacity forecaster to generate a context having information identifying a type of the one or more storage units of the storage system and an operator operating the storage system, wherein the context is used to communicate with the operator for acquiring an additional storage unit to increase storage capacity prior to the full capacity date; and
   an evaluator to evaluate the results of one or more contexts including at least a result associated with the generated context;
   wherein the context generator is configured to be updated based at least in part on the evaluation and the updated context generator is usable to generate a subsequent context based at least in part on a subsequent full capacity date, and
   wherein the capacity forecaster is configured to identify a user that is associated with the operator of the storage system based on a set of one or more rules, transmit the context to the identified user to enable the user to contact the operator of the storage system to acquire more storage capacity prior to the forecast full capacity date, wherein the context is transmitted to the identified user at a predetermined time before the forecasted full capacity date, and to be updated based at least in part on the evaluation and the updated capacity forecaster is usable to forecast a subsequent full capacity date, and
   wherein using of the updated context generator to generate a subsequent context includes updating the predetermined time before the forecasted full capacity date using predictive modeling.

17. The system claim 16, wherein the identified user has a prior relationship with the operator of the storage system.

18. The system of claim 16, wherein the identified user is located within a same geographic region as the operator of the storage system.

* * * * *